Dec. 4, 1962     H. G. CHINN     3,067,309

FLEXIBLE HEAT-SEALING UNIT

Filed Aug. 1, 1958

INVENTOR.
HYMAN G. CHINN

BY *Walter C. Kehm*

ATTORNEY 3,067,309
FLEXIBLE HEAT-SEALING UNIT
Hyman G. Chinn, Somerville, N.J., assignor to Union
Carbide Corporation, a corporation of New York
Filed Aug. 1, 1958, Ser. No. 752,494
3 Claims. (Cl. 219—19)

This invention relates in general to apparatus for forming seals in wrapping and packaging and more particularly to a flexible heating unit for forming seals between overlapping sheets of thermoplastic material.

Heretofore it has been common practice in forming seals between two or more layers of plastic or plastic coated materials to place the area to be sealed between two rigid bars or jaws either or both of which are heated to a temperature sufficient to melt or soften the plastic and apply pressure to cause the plastic to flow into a unitary mass. Imperfect seals often resulted when the surface area supporting the layers of plastic sheeting was non-planar. Unacceptable seals also resulted when irregular folding of the plastic sheets or fibers caused variations in thicknesses of plastic to be sealed.

It has also been proposed heretofore, to use rigid jaws formed so as to conform to the irregular surface to be sealed. Disadvantages in this approach however still pose substantial problems. For instance, a large number of specially shaped jaws must be stocked if a variety of surface configurations are to be sealed. A typical sealing problem involving non-planar surfaces occurs in attempting to seal the overlapping edges of plastic sheeting which has been wrapped around a relatively light-weight cardboard box. The edges of any wall of the box are supported by the other walls attached perpendicularly thereto. The center portion of any wall is not supported. When a rigid heat-sealing member is applied across the surface of a wall, there is frequently a slight canting of the supporting perpendicular walls with a resultant bowing of the surface to be sealed. A rigid sealing bar is not able to follow the contour and thus does not form a complete and effective seal.

In another situation, the wrapped article may be non-rigid or yielding thus presenting not only an irregular surface for sealing but also a surface which may distort into a countless number of shapes depending on which part of the surface is subjected to the pressure jaw first.

It is therefore a general object of the invention to provide a heat-sealing unit which avoids the difficulties and limitations of prior art units.

It is a more specific object to provide a heat-sealing unit which will form perfect seals over an irregular or non-planar area and will function continuously on a series of such surfaces, even though the irregularities differ from one area to another, without adjustment by means not inherent in the unit itself.

Another object is to provide a heat-sealing unit which will remain free of deposits of plastic pulled from the surface being sealed without the use of a protective coating or separator.

Other and further objects and advantages will be obvious by reference to the specification, the appended claims, the examples, and to the drawings in which:

According to the present invention there is provided a heat-sealing device whereby uniform seals may be made on non-planar surfaces and over areas having a non-uniform thickness of plastic sheets. Essentially the heat-sealing unit comprises a flexible and preferably also resilient strip of heated material brought into intimate compliance with the working surface to be sealed by the positive urging of a plurality of independent pressure members.

Figure 1:
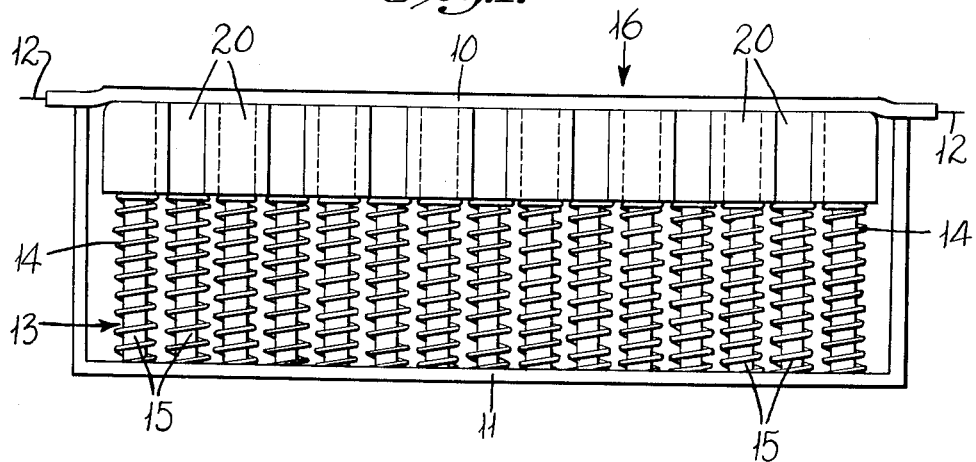
FIG. 1 is a view of one embodiment of the invention taken along line 1—1 of FIG. 2.

Referring in more detail to the drawings and particularly to FIG. 1 which shows a sideview of a typical embodiment of the heat-sealing unit of the present invention, reference numeral 10 identifies a flexible sealing strip comprising a heat-conducting and preferably an electrical conducting material resistant to heat degeneration. Strip 10 is attached by any convenient means to supporting frame member 11. When the heating strip 10 is elastic as well as flexible, the attachment to frame 11 is advantageously non-yielding. If, however, a strip of thin, flexible, but non-elastic material is employed, the attachment to frame 11 may be such as to permit sufficient movement of the strip for said strip to be brought into complete compliance with an irregular surface. Strip 10 is provided with binding posts 12 for the attachment thereto of electrical leads from an electrical power source (not shown) which provides the energy necessary to generate the required amount of heat in sealing strip 10. When strip 10 is formed from a heat and electrically conducting material, the strip may serve as its own heating element.

Many carbon filled conductive rubber compositions are available commercially, especially silicone rubbers, which conduct heat and electricity well and show little tendency to adhere to heat-softened plastic material. Primarily for this reason, carbon filled elastic silicone rubber is particularly preferred as the material comprising the heating strip 10. It will be obvious to those skilled in the art, however, that many modifications are possible without departing from the scope of the invention. For instance, a flexible heat-conducting rubber may be employed which is heated by means of an internal wire or wires comprising the electrical heating element or elements. Mounted in the support frame 11 are independent pressure members 13 which are substantially restrained from movement except in a direction generally perpendicular to the flexible strip 10. As shown in the drawings, these pressure members may be comprised of blocks of heat resistant material 20, each block being attached through a compression spring member 14 to the frame 11. When the frame is in the form of a box and the pressure members are spaced closely enough together, movement of the pressure blocks is restrained in all but the desired manner. In the event the pressure blocks are situated somewhat apart from each other, a sleeve support or a rigid member 15 may be placed within the spring coils to prevent bowing of the springs. The number of pressure blocks and their relative placement is chosen with reference to the nature of the surface with which the flexible sealing strip 10 is to be brought into compliance.

In FIG. 1 the pressure members are shown as being placed in two uniform parallel lines. This configuration is sufficient to permit compliance of the sealing strip to commonly encountered planar and non-planar surfaces, but it is obvious that a larger number of randomly placed pressure members will increase the ability of said sealing strip to comply with more irregular surfaces requiring heat sealing. While the embodiment shown contains spring mounted blocks as the pressure members, it is possible to positively urge the sealing strip 10 into compliance with the surface to be sealed by other means such as hydraulic or pneumatic cylinders or independent columns of compressible or elastic material such as sponge rubber and the like without departing from the scope of the present invention.

Figure 2:
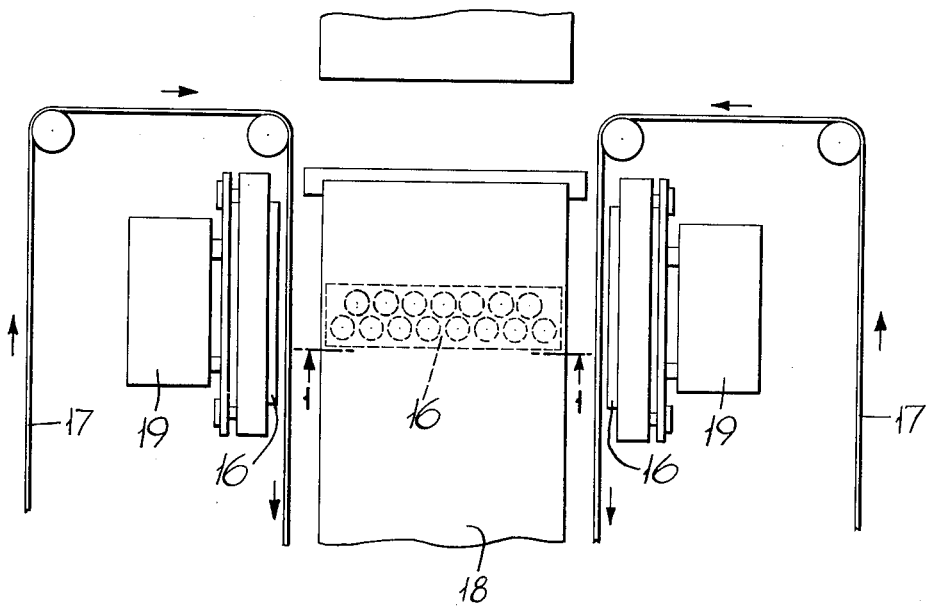
FIG. 2 is a partial plan view of a conventional overwrapping machine in which the heat-sealing units of the present invention may be incorporated.

In FIG. 2 the heat-sealing units 16 are shown incorporated in a typical apparatus for performing overwrapping operations. Conventionally, the article to be packaged is wrapped in a sheet of material which is heat-sealable or which has a heat-sealable coating (wrapping means not shown) and fed by means of moving conveyor belts 17 along platform 18 into a position where the areas to be sealed may be contacted by the heated sealing units. Advantageously the units shown in FIG. 2 are mounted on suitable means 19 to force them against the surface areas to be sealed in such a way that the sealing strips of said units are in complete compliance with the contour of the surface to be fused for a period sufficient to form a complete seal. Other embodiments may, of course, be apparent from considerations of the nature of the package being sealed. For instance, where very long continuous seals are required the sealing unit may have a circular wheel-like shape in which the outer periphery is formed by the flexible heat-sealing strip supported by pressure members in a spoke-like configuration. The unit can then be caused to roll along the surface to be sealed and at the same time continuously and instantaneously adjust into complete compliance with the contours of said surface.

While the novel heat-sealing unit of the present invention has particular utility when used in conjunction with a semi-automatic or fully automatic apparatus for an assembly line type of wrapping and sealing operation, it is not confined to such use and may be advantageously utilized as a hand-held device in sealing operations not adaptable to automation.

The heat-sealable materials to which the present invention is applicable include any heat-sealable thermoplastic sheet or thermoplastic coated sheet conventionally used in wrapping or packaging. When the material is of such a nature as to become tacky during the sealing operation and tends to adhere to the flexible sealing strip, the problem may largely be eliminated by forming said strip of a suitable conductive rubber or other elastic or yielding material which has little adhesive affinity for the softened heated plastic. Especially preferred is the silicone rubber composition described in Example I.

*Example I*

A flexible heat-sealing strip for use in the sealing unit of the present invention was formed from a composition containing the following constituents which were compounded and cured according to the method herein described:

| | Parts by weight |
|---|---|
| Conducting carbon black | 13.50 |
| Fume silica (Cab-O-Sil [1]) | 2.40 |
| Copolymer | 30.00 |
|    Dimethyl siloxane—99.85% by weight | |
|    Ethyl-vinyl siloxane—0.15% by weight | |
| Recrystallized dicumyl peroxide | 0.03 |

[1] Godfrey L. Cabot, Inc.

The fillers were added to the copoylmer on a rubber compounding mill. The total time consumed in adding the fillers and milling the compound was approximately forty minutes. The compound was allowed to stand at room temperature for approximately two weeks. The recrystallized dicumyl peroxide was added on a rubber compounding mill to this filled compound. The resulting composition was sheeted from the mill and a thin strip was cut from the sheet and hung in a steam autoclave. The strip was cured at 80 lbs./sq. in. (gauge) for 20 minutes. The hardness (Shore A) of this product was 55. Thereafter the sheet was hung in a circulating air oven for 16 hours at 480° F. The hardness (Shore A) of this product was 57.

*Example II*

A sealing unit similar in design to that embodiment shown in FIG. 1 of the drawings and having a flexible sealing strip of the silicon rubber material set forth in Example I was employed to seal a wrapping of 1.5 mil thick polyethylene film. In carrying out the heat sealing operation, the polyethylene film was overwrapped on a 4 x 4 x 8 inch thin cardboard carton in such a manner as to position the overlapping layers of film longitudinally along and in the center of one of the 4 x 8 faces of the carton. The carbon filled silicone rubber heating strip of the sealing unit was heated to a temperature of about 250° C. by means of an electrical current passed therethrough. The unit was applied by hand to the overwrapped carton so that the rubber heating strip was brought into compliance with the overlapping film area to be sealed through the positive urging of the spring loaded pressure members for a period of about 2 seconds. It was observed that even though the carton face contacted by the sealing unit bowed inwardly under the contact pressure, the entire area to be sealed was in compliance with the heating strip and the seal was complete and excellent in all respects. In addition, the film covering the edges of the carton face was not ruptured or otherwise damaged. No bits of molten plastic adhered to the heating strip.

Although the invention has been described with a certain degree of particularity, it is to be understood that the description of the embodiment in FIG. 1 and the examples has been made only by way of illustration and that numerous changes may be made in the manner and materials of construction and the arrangement of parts without departing from the substance and scope of the invention as hereinafter claimed.

What is claimed is:

1. A heat-sealing apparatus suitable for sealing overlapping sheets of heat-sealable material which comprises in combination, a directly heated, flexible, heat conducting member of a resilient rubber material, said member being provided with an internally contained electrical heating element and means for applying an electrical potential across said heating element whereby elevated temperatures are induced in said heat-conducting member; a plurality of independently operating pressure members; a substantially rigid frame support for said flexible heat-conducting member and said pressure members, said pressure members being yieldably mounted on said frame support as to urge said flexible heat-conducting member into compliance with the work surface of the materials to be sealed, said pressure members being spaced apart in two directions and distributed over an area of said support member facing the work surface.

2. Apparatus suitable for heat-sealing superimposed plies of heat-sealable material on a substantially non-planar rigid surface which comprises, in combination, an elastic, flexible, and resilient heating member of a heat and electrically conducting plastic composition, a substantially rigid frame member for tensioning said plastic heating member and supporting a plurality of independently operating pressure members, said pressure members being spaced apart in two directions and distributed over an area of said rigid frame member facing the work surface and being so adapted as to urge said heating member into compliance with the work surface of the plies to be sealed.

3. An apparatus as described in claim 2 in which the plastic composition comprising the heating member is a carbon filled silicone rubber characterized by being electrically conductive, resilient, flexible, and non-adhering to heat softened thermoplastic resins.

References Cited in the file of this patent

UNITED STATES PATENTS

| | | |
|---|---|---|
| 364,948 | Moore | June 4, 1887 |
| 2,016,627 | Conti et al. | Oct. 8, 1935 |
| 2,421,373 | Cozza | June 3, 1947 |
| 2,460,460 | Langer | Feb. 1, 1949 |
| 2,559,077 | Johnson et al. | July 3, 1951 |
| 2,629,808 | Ulmscheider | Feb. 24, 1953 |
| 2,714,416 | Fener | Aug. 2, 1955 |
| 2,782,818 | Christeson | Feb. 26, 1957 |

FOREIGN PATENTS

| 889,515 | France | Oct. 4, 1943 |